(12) United States Patent
Zontov

(10) Patent No.: US 7,838,454 B2
(45) Date of Patent: Nov. 23, 2010

(54) METHOD AND APPARATUS FOR DESORBING MATERIAL

(75) Inventor: Nikolai Zontov, Keysborough (AU)

(73) Assignee: Clean Teq Pty Ltd., Dandenong, Victoria (AU)

( * ) Notice: Subject to any disclaimer, the term of this patent is extended or adjusted under 35 U.S.C. 154(b) by 591 days.

(21) Appl. No.: 10/556,294

(22) PCT Filed: May 7, 2004

(86) PCT No.: PCT/AU2004/000606

§ 371 (c)(1),
(2), (4) Date: Oct. 24, 2006

(87) PCT Pub. No.: WO2004/098776

PCT Pub. Date: Nov. 18, 2004

(65) Prior Publication Data

US 2007/0056909 A1    Mar. 15, 2007

(30) Foreign Application Priority Data

May 9, 2003   (AU) ............................. 2003902238
Aug. 29, 2003 (AU) ............................. 2003242501

(51) Int. Cl.
*B01J 37/30* (2006.01)
(52) U.S. Cl. .......................................... 502/12; 502/20
(58) Field of Classification Search .................. 502/12, 502/11, 20
See application file for complete search history.

(56) References Cited

U.S. PATENT DOCUMENTS

| 3,677,937 | A |   | 7/1972  | Higgins et al. |         |
|-----------|---|---|---------|----------------|---------|
| 4,412,866 | A | * | 11/1983 | Schoenrock et al. | 127/46.2 |
| RE31,456  | E | * | 12/1983 | Carlson        | 210/676 |
| 4,670,154 | A |   | 6/1987  | Carlson et al. |         |
| 6,114,577 | A | * | 9/2000  | Verhoff et al. | 562/580 |
| 2004/0030180 | A1 | * | 2/2004 | Takaki et al.  | 560/224 |
| 2005/0127006 | A1 | * | 6/2005 | Stromquist     | 210/670 |

FOREIGN PATENT DOCUMENTS

| EP | 0 068 411    | 1/1983 |
| EP | 0 770 427 A2 | 5/1997 |

OTHER PUBLICATIONS

Derwent Abstract Accession No. 96-009099/01, RU 2034056 C1, Apr. 30, 1994.
Derwent Abstract Accession No. 96-220452/22, RU 2044078 C1, Sep. 20, 1995.

* cited by examiner

*Primary Examiner*—Timothy C Vanoy
*Assistant Examiner*—Michelle Hou
(74) *Attorney, Agent, or Firm*—Merchant & Gould P.C.

(57) ABSTRACT

The present invention relates to a method and apparatus for the continuous countercurrent desorption of targeted materials including metals, non-metals and inorganic and/or organic compounds of thereof, wherein the desorption method is divided to the two modes namely: (I) desorption and (II) re-absorption. The desorption of the target material from the loaded resin using the fresh desorbent takes place in mode (I). According to mode (I) loaded resin moves upwardly in a chamber. According to mode (II) impurities are desorbed from resin and targeted material in solution can be re-absorbed. The resin moves downwardly in another chamber during mode (II). Concentrated eluates, which are suitable for the direct economical recovery of chemical elements and/or compounds thereof, can be produced using the present invention. The apparatus of the present invention includes desorption and re-absorption zones that are configured using a "pipe-in-pipe" construction or a U-shape construction.

18 Claims, 6 Drawing Sheets

METHOD AND APPARATUS FOR DESORBING MATERIAL

FIELD OF THE INVENTION

The present invention relates to a method and apparatus for desorbing materials from a loaded ion exchange resin.

The ion exchange resin may be any suitable resin that can be loaded with target materials that include non-ferrous metals such as copper, nickel and cobalt; noble metals such as gold and silver; and refractory metals such as molybdenum and wolfram. The exchange resin may also be suitable for any other metal, non-metal, organic substances, non-organic substances and compounds thereof.

BACKGROUND OF THE INVENTION

There is at present a wide selection of technology that can be used for desorbing materials from resins. Some technologies are better suited than others for particular applications and, therefore, selecting the most appropriate technology is an important factor in achieving a high desorption rate and cost effectiveness.

Generally speaking desorption processes for desorbing material from a resin may be carried out as either batch or continuous operations which usually corresponds to the apparatuses for carrying out processes having either so-called fixed-beds or moving-beds.

Apparatuses with fixed-beds are at present the most widely used in industry. For example, a text by Abrams I. M. entitled "Type of ion-exchange systems" (Ion Exchange for Pollution Control, eds. C. Calmon and H. Gold, CRC Press, Boca Raton, vol. 1, pp. 71-850, 1979) describes that fixed-bed equipment items have been operated for more than. 25 years and are still presently in use for softening 1500 mega-liters/day of water at the Metropolitan Water District of Southern California.

A text by Salem E. entitled "Equipment operation and design" (Ion Exchange for Pollution Control, eds. C. Calmon and H. Gold, CRC Press, Boca Raton, vol. 1, pp. 87-100, 1979) describes that the desorption cycle of most fixed-bed apparatuses involves: firstly backwashing a bed of full loaded or saturated resin; settling the bed; feeding desorption solution through the bed; displacement of desorption solution (or slow rinse); and finally rinsing the resin before supplying a pregnant solution to the bed again.

The backwashing stage removes suspended particles, which have accumulated within the resin bed and eliminates channels that, may have formed during the sorption stage. Backwashing also helps to break up agglomerates formed between suspended particles and the ion-exchange resin.

The settling stage follows the backwashing stage and is important to avoid channeling of fluid through the bed.

Desorption is accomplished by passing desorption solution through the bed to convert the resin to the desired form. After an adequate volume of desorption solution has made contact with the resin, displacement of desorption solution from the bed takes place.

Rinsing of the resin with demineralised water is normally used to remove the last residues of desorption solution from the bed.

Upon completion of the rinsing stage, the liquid phase containing targeted material to be sorbed into the resin during a sorption stage enters at the top of the column when the column is operated in co-current or at the bottom of the column when the column is operated in countercurrent.

U.S. Pat. No. 4,412,866 describes a modification of a batch-fixed bed process and in particular relates to a simulated moving-bed in which separate zones are defined, each of which include one or more discrete vessels. The zones correspond to the functions of the process; typically sorption, displacement, desorption and rinsing. Booster pumps connected in series with the vessels maintain a desired pressure head for each zone. The functions of each zone are rotated in sequence, the sequence being timed in relation of the migration of the front between adjacent phases in the fluid loop circulating through the zones.

Another type of absorption/desorption processes is a continuous process. Generally speaking an absorption/desorption process is classified as a continuous process when sorption, rinsing and desorption are conducted simultaneously and the product flow is uninterrupted. The use of a moving bed of resin allows one to obtain continuous operation and the main advantage is the high processing efficiency.

As with batch processes, continuous processes can be operated as either co-current or countercurrent.

Not all processes described as continuous are truly continuous processes. Truly continuous processes operate without interruption of either resin or liquid flows. Semicontinuous processes are often characterised by a short residence period in which ion-exchange absorption occurs (i.e. the service mode) followed by a period when the resin bed is moved (the moving mode). However, because the periods for both modes are very short, the processes virtually behave as a continuous one. More than a hundred semicontinuous processes are known, but only about six have any real industrial significance.

To our understanding the widest known process of this type is the so-called Higgins Loop (and is described in the text by Higgins, I. R. and Roberts, I. T. "A countercurrent solid-liquid contactor for continuous ion-exchange". Eng Prog. Symp. Ser., 50, 87-94, 1950). The Higgins Loop is a continuous countercurrent ion-exchange process for liquid phase separations of ionic components using solid ion-exchange resin.

The Higgins Loop comprises a vertical cylindrical vessel containing a packed-bed of ion-exchange resin that is separated into four operating zones by butterfly or loop valves. These operating zones—adsorption, desorption, backwashing and pulsing—function like four separate vessels.

The Higgins Loop treats liquids in the sorption zone with resin while the ions are removed from loaded resin in the desorption zone simultaneously. Intermittently, a small portion of resin is removed from the respective zone and replaced with stripped or loaded resin at the opposite end of that zone. This is accomplished hydraulically by pulsation of the resin through the loop. The result is a continuous process that contacts liquid and resin in countercurrent flow.

It is an object of the present invention to provide an alternative method and apparatus for desorbing materials sorbed on a resin that is capable of producing a concentrated eluate stream.

SUMMARY OF THE INVENTION

According to the present invention there is provided an apparatus for desorbing substances from an ion exchange resin having impurities and targeted materials sorbed thereon, the apparatus including:

first and second chambers that are adapted so that when in use, resin is supplied to the first chamber and conveyed from the first chamber to the second chamber, and a desorption solution is supplied to the second chamber and conveyed from the second chamber to the first chamber such that, i) impurities having less affinity for the resin than the targeted material can be desorbed from the resin and targeted material can be sorbed onto the resin from the desorption solution, and thereby create conditions whereby an impurity stream having a high concentration of impurities and a relatively low concentration of targeted material can be discharged from the first chamber, and ii) targeted material can be desorbed from the resin in the second chamber and create conditions whereby a rich stream having a low concentration of impurities and a relatively high concentration of targeted material can be discharged from lower regions of the first and/or second chambers.

In addition, when the apparatus is in use, it is preferred that the resin flows downwardly in the first chamber and upwardly in the second chamber, and that desorption solution flows in countercurrent to the direction of flow of resin in said chambers.

It is even more preferred that the impurities stream be discharged from an upper region of the first chamber.

It is preferred that the first and second chambers be connected in fluid communication such that the desorption solution can be conveyed from the second chamber to the first chamber.

According to the present invention there is also provided an apparatus for desorbing material from a loaded ion exchange resin, the apparatus including:

first and second chambers that are adapted so that in use, resin can move downwardly in the first chamber and upwardly in the second chamber and desorption solution can flow in counter current to the resin;

first and second inlets for supplying loaded resin to the first chamber and desorption solution to the second chamber respectively, and first and second outlets for discharging a liquid from the apparatus and stripped resin from the second chamber respectively;

means for facilitating the transferal of resin from the first chamber to the second chamber and conveying the resin upwardly in the second chamber; and in use, a first stream of desorption solution containing a relatively high concentration of impurities and a low concentration of targeted materials can be discharged from the first outlet, a second stream of desorption solution containing a relatively high concentration of targeted material and a low concentration of impurities can be discharged via the first outlet from lower regions of the first and/or second chambers and/or taken from desorption solution passing from the second chamber to the first chamber, and a stripped resin can be discharged from the second outlet of the second chamber.

Advantages provided by the present invention include:

ii) impurities having less affinity for the resin than the targeted material are desorbed from the resin before the targeted material and thus the first stream of desorption solution has a higher concentration of impurities can be discharged from the first chamber where the desorption solution first comes into contact with the resin;

iii) upon desorption of the impurities from the resin, the capacity of the resin to absorb targeted materials increases which allows the first chamber to have a zone for re-adsorbing targeted materials onto the resin; and iv) targeted materials desorbed from the resin passes into the desorption solution and thereby increases the density of the solution so that it tends to settle under gravity in the chambers and thus facilitate the second stream of desorption solution containing a relatively high concentration of targeted substances and a low concentration of impurities to be discharged from the lower region of the apparatus.

It is preferred that the desorption of impurities from the resin occurs in an upper zone of the first chamber and thereby allows further targeted material to be sorbed onto the resin in the upper zone. In other words, the upper zone forms re-adsorption zone.

It is preferred that the first and second chambers be connected in fluid communication such that the liquid head in the second chamber causes the desorption solution to flow upwardly in the first chamber.

It will be appreciated that as a result of the desorption solution being supplied into the second chamber, the predominant direction of flow of desorption solution is from the second chamber into the first chamber. It will also be appreciated that the net upwardly flow of desorption solution in the first chamber will be substantially equal to the rate at which the first stream of desorption solution is discharged from the first chamber.

It is preferred that the first outlet for discharging the first stream of desorption solution be in an upper region of the first chamber. An advantage provided by this preferred feature is that the desorption solution first comes into contact with the resin in the upper region of the first chamber and impurities having less affinity for the resin than the targeted material can be withdrawn from the upper end of the first chamber.

It is preferred that the second outlet for discharging stripped resin be located in the upper region of the second chamber. An advantage provided by this preferred aspect is that the resin is progressively exposed to a desorption solution having lower concentrations of targeted materials as the resin moves upwardly in the second chamber and thereby creates a larger potential for desorption of targeted materials from the resin in the second chamber before the resin is discharged from the apparatus.

It is preferred that a passageway extend downwardly from the second outlet for conveying stripped resin to an intermediate chamber before being discharged from the apparatus.

It is preferred that the first and second inlets for supplying resin and desorption solution into the first and second chambers respectively be located in the upper region of the chambers.

It is preferred that the apparatus have control means for controlling the rate of removal of resin from the second chamber. In use, the control means measures the liquid level of the desorption solution in the first chamber to control the rate at which resin is removed form the second chamber.

It is preferred that the second chamber have another inlet for supplying a concentrated solution of targeted materials into the second chamber. We have found that adding a concentrated solution into the second chamber further increases the concentration of the targeted materials in the second stream of desorption solution (ie an eluate stream) and decreases the concentration of impurities in the second stream.

The preferred features of two embodiments of the present invention will now be described.

It is preferred that the first and second chambers be interconnected by a passageway that extends from the first chamber to the second chamber, the passageway being adapted for conveying the resin and desorption between the chambers.

According to one embodiment of the invention, it is also preferred that the first and second chambers be interconnected in U-shape having a base and two arms whereby the first and second chambers form the arms of the U-shape and the base provide the passageway.

It is preferred that the second stream of desorption solution containing a high concentration of desorbed material be discharged from the passageway extending between the first and second chambers. In the instance when the first and second chambers are interconnected in a U-shape, the second stream of desorption solution having a high concentration of targeted material is discharged from the base of the U-shape.

According to another embodiment of the invention, it is the preferred that the first and second chambers be arranged such that one of the chambers is located inside the other chamber.

It is even more preferred that the second chamber be located concentrically within the first chamber.

In the instance when the second chamber is located within the first chamber, it is preferred that the first chamber have an opening facing downwardly so that desorption solution from the second chamber can flow into the second chamber and that the resin from the second chamber enter the first chamber through the opening and be forced to move upwardly therein.

It is preferred the second stream of desorption solution be discharged from the first chamber at a location below the opening of the second chamber.

It is preferred that a bottom wall of the first chamber be declined toward an outlet for discharging the second stream of desorption solution having a high concentration of targeted substances.

According to the present invention there is provided a method for desorbing substances from an ion exchange resin having impurities and targeted materials sorbed thereon, the method including treating an ion exchange resin in an apparatus having first and second chambers, wherein the method includes the steps:

a) desorbing impurities from the resin in the first chamber using a desorption solution so that targeted materials having more affinity for the resin than the impurities can be sorbed onto the resin from the desorption solution and thereby creating conditions whereby a stream having a high concentration of impurities and a low concentration of targeted material can be discharged from the first chamber; and b) desorbing targeted materials from the resin treated according to step a) in the second chamber using the desorption solution and thereby create conditions whereby a stream having a high concentration of targeted materials and a low concentration of the impurities can be discharged from the apparatus.

According to the present invention there is also provided a method for desorbing substances from a resin in an apparatus having first and second chambers connected in fluid communication, the method including the steps of:

a) supplying a loaded resin having targeted materials and impurities sorbed thereon to the first chamber and the resin moving in a downward direction therein;

b) conveying the resin from the first chamber to the second chamber and moving the resin in an upward direction therein;

c) supplying a desorption solution to the second chamber such that the solution flows downwardly in the second chamber and upwardly in the first chamber in countercurrent flow to the resin;

d) discharging stripped resin from the second chamber;

e) discharging a first stream of desorption solution containing a high concentration of impurities and a low concentration of targeted substances from the first chamber; and a) discharging a second stream of desorption solution containing a relatively high concentration of targeted material and a relatively low concentration of impurities from a lower region of the first and/or second chambers and/or from the solution being conveyed between the chambers.

It is preferred that any two or more of steps a) to f) be carried out simultaneously.

It is preferred that the impurities on the resin have less affinity for the resin than the targeted materials so that when the resin is contacted by the desorption solution in the first chamber, the impurities tend to be desorbed from the resin before desorption of the targeted materials.

It is preferred that the desorption of impurities from the resin occurs in an upper zone of the first chamber and thereby allows further targeted material to be sorbed into the resin in the upper zone.

It is therefore preferred that the first stream discharged in step e) be discharging the upper region of the first chamber.

It is preferred that targeted materials desorbed from the resin and dissolved into solution increase the density of the solution thus causing fractions of the solution having high concentrations of targeted solutions to settle under gravity toward the lower regions of the first and second chambers.

It is therefore preferred that the second stream discharged in step f) be discharged from the solution being conveyed between the chambers or from the lower regions of the first and/or second chambers.

It is preferred that the rate, at which resin is discharged in step d), be controlled by the liquid level in the first chamber.

It is preferred that the resin discharged in step d) be discharged from upper regions of the second chamber.

It is preferred that the method also include supplying a concentrated solution of targeted substances into the second chamber. We have found that adding a solution of concentrated solution into the second chamber further increases the concentration of the targeted substances in the second stream of desorption solution (ie an eluate stream) and decreases the concentration of impurities in the second stream.

It is preferred the temperature of the concentrated solution range from approximately 60 to 100° C.

It is preferred that the additional solution be supplied into the second chamber at a location between the upper and lower regions of the second chamber.

The method of the present invention may also include any one of the features of the apparatus described above.

BRIEF DESCRIPTION OF THE DRAWINGS

Two preferred embodiments of the present invention will now be described with reference to the accompanying drawings, of which.

DETAILED DESCRIPTION OF PREFERRED EMBODIMENTS

Figure 1:
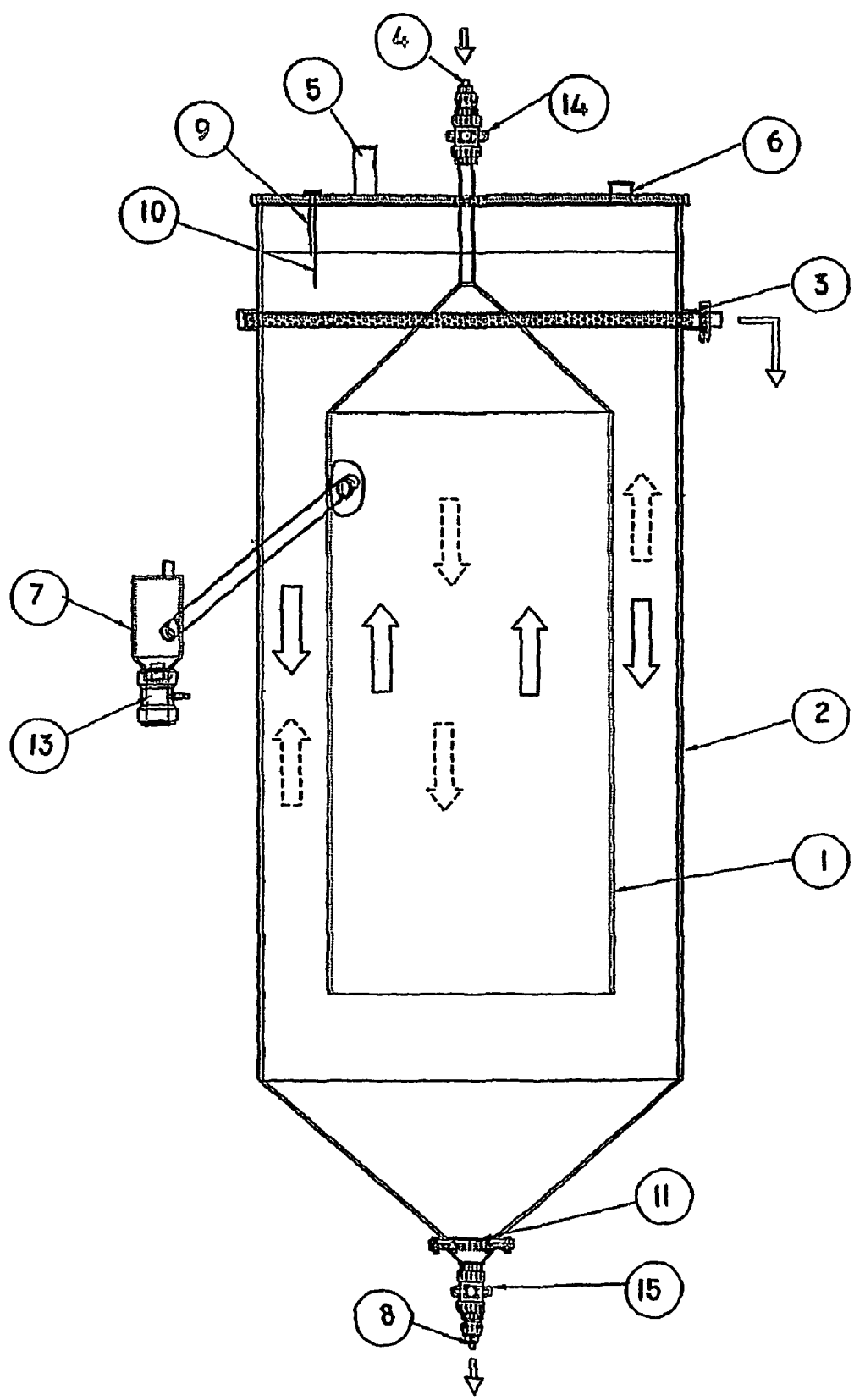
FIG. 1 illustrates an apparatus for desorbing material from a resin according to one embodiment of the invention, wherein the apparatus includes two chambers one chamber is located inside the other.

The two preferred embodiments have a number of features in common and the same reference numerals have been used to identify the same or alike features on both embodiments where possible.

The preferred embodiment illustrated in the FIG. 1 comprises an apparatus having two chambers in which an inner chamber 1 is located concentrically within the outer chamber 2.

The inner chamber 1 has an inlet valve 14 for supplying desorption solution to the inner chamber and an outlet for stripped resin. Extending from the outlet is a conduit that feeds stripped resin into an intermediate tank 7. The lower end of the inner chamber 1 has an opening facing downwardly so that desorption solution flows downwardly in the inner 1 chamber and upwardly in the outer chamber 2 in the direction of the dashed arrows.

The liquid head of desorption solution in the inner chamber 1 causes the desorption solution to flow upwardly in the outer chamber 2.

The outer chamber 2 has a resin inlet or spigot 5 for supplying saturated resin into the outer chamber 2. Resin in the outer chamber 2 moves downwardly in the direction of the arrows shown in solid lines in countercurrent to the desorption solution. The resin is also forced through the opening in the inner chamber 1 and upwardly in the inner chamber 1 in the direction of the arrows shown in solid lines in countercurrent flow to the desorption solution.

In use, loaded resin enters through the spigot 5 and contacts the loaded resin in the top of the outer chamber 2. At first instance, impurities having less affinity for the resin than the targeted material are desorbed from the resin. As a result, a stream of desorption solution having a high concentration of impurities is discharged via outlet drain 3.

Upon desorption of the impurities form the resin, the capacity of the resin for sorbing targeted material may increase such that an upper region of the outer chamber 1 in which the impurities are desorbed may also form a re-adsorption zone for re-adsorbing the targeted material onto the resin. Normally, the re-adsorbing zone formed in the upper region of the first chamber 1 keeps the concentration of the targeted materials low in the stream of desorption solution discharged via the outlet drain 3.

The loaded resin migrates down past the re-adsorption zone and into the inner chamber 1 where targeted material is desorbed in a desorption zone of the apparatus.

Resin moves along the inner and outer chambers 1 and 2 using any suitable means such as resin pulsation. In the case of the embodiment shown in FIGS. 1 to 3, resin pulsation is carried out by opening valve 13 for discharging resin from apparatus, closing valve 14 so as interrupted the supply of desorption solution and pumping air into the column via the spigot 6 located on the top of the re-adsorption zone.

Electrodes 9 and 10, which measure the level of desorption solution in the outer chamber 2 of the apparatus control the rate at which resin is removed from the apparatus. Resin movement within the chambers 1 and 2 may take place periodically once every 0.5-3.0 hours and continue for about 0.5-2.0 minutes depending on the properties of the resin, the targeted material and the conditions of the desorption process.

Desorption solution is pumped into the inner chamber 1 via the spigot 4 and the valve 14. Desorption solution strips the target material from the oversaturated resin during its movement past desorption zone 1 downwardly to the bottom of the apparatus. A stream of desorption solution containing a high concentration of targeted material and a low concentration of the impurities is discharged from the bottom of the apparatus via the pipe 8. The flow of solution from the bottom of the apparatus is regulated using valve 15.

A screen 11 at the bottom of the apparatus retains the resin in the outer chamber 2 as solution is discharged.

Figure 2:
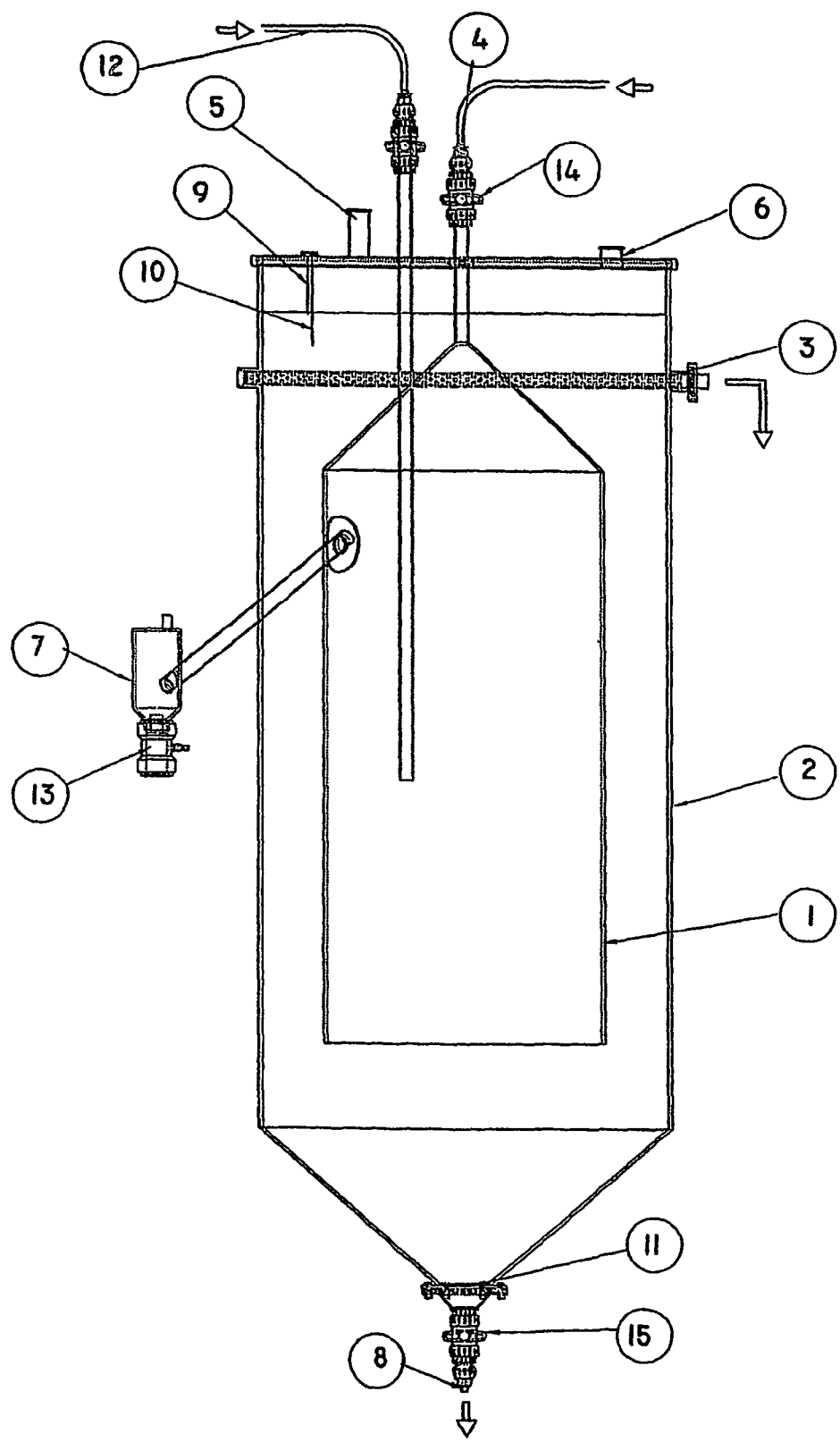
FIGS. 2 and 3 illustrate the embodiment shown in FIG. 1 with additional features.
Figure 3:
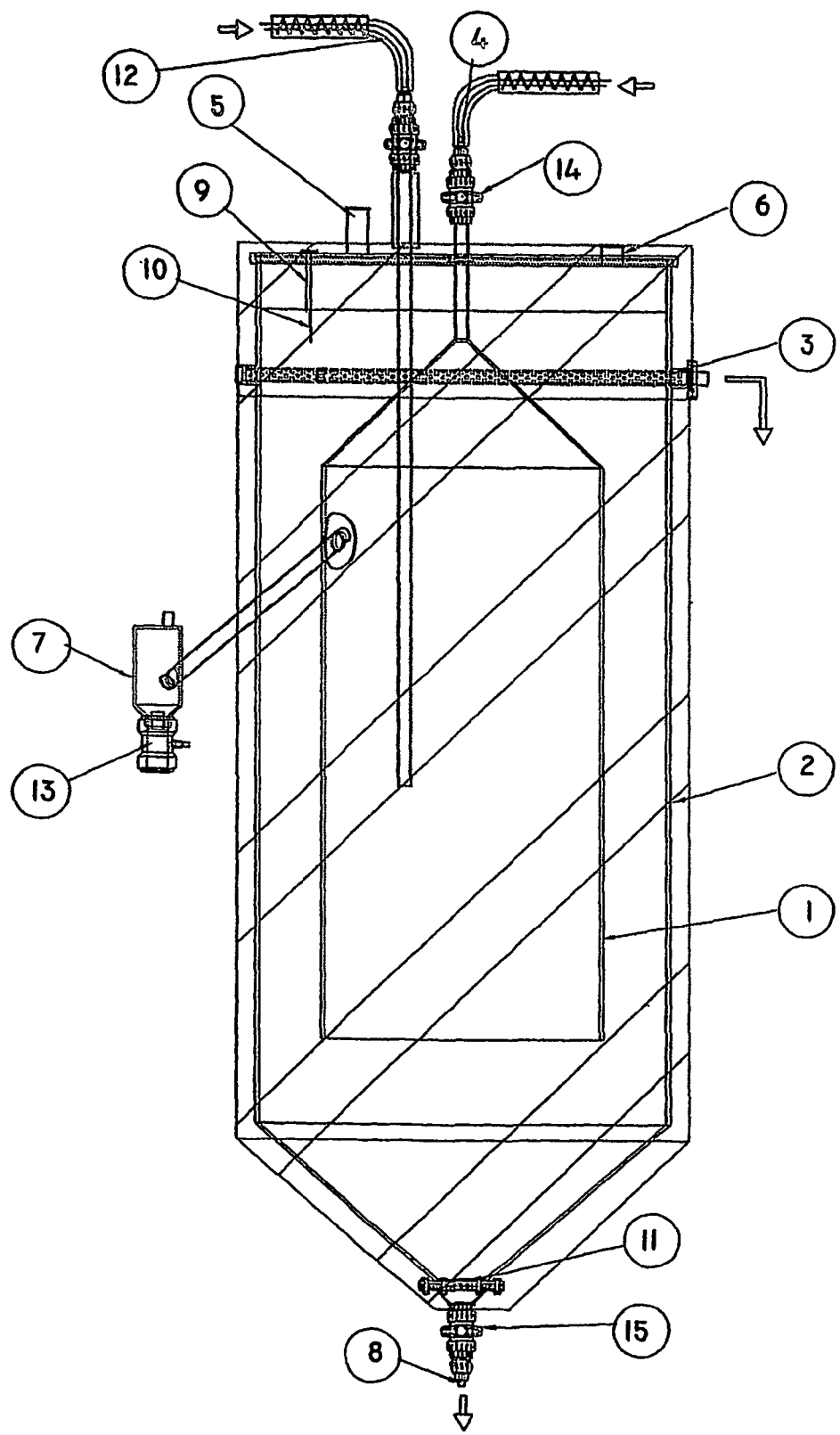

FIGS. 2 and 3 illustrate the apparatus shown in FIG. 1 having an inlet 12 for supplying a concentrated solution of targeted materials into the middle of the inner chamber 1. We have found that the addition of a concentrated solution to the inner chamber 1 reduces the concentration of impurities and increases the concentration of targeted material discharged from the apparatus through valve 15.

FIG. 3 illustrates the apparatus fitted with a heat exchange means for preheating the desorption solution supplied into the inner chamber 1 via inlet 12 and valve 14 for aiding the desorption of material from resin to the desorption solution. The desorption solution is preferably heated to a temperature ranging from 60° C. to 100° C.

The apparatus is also includes external insulation for maintaining the temperature of the desorption solution in the chambers 1 and 2.

Figure 4:
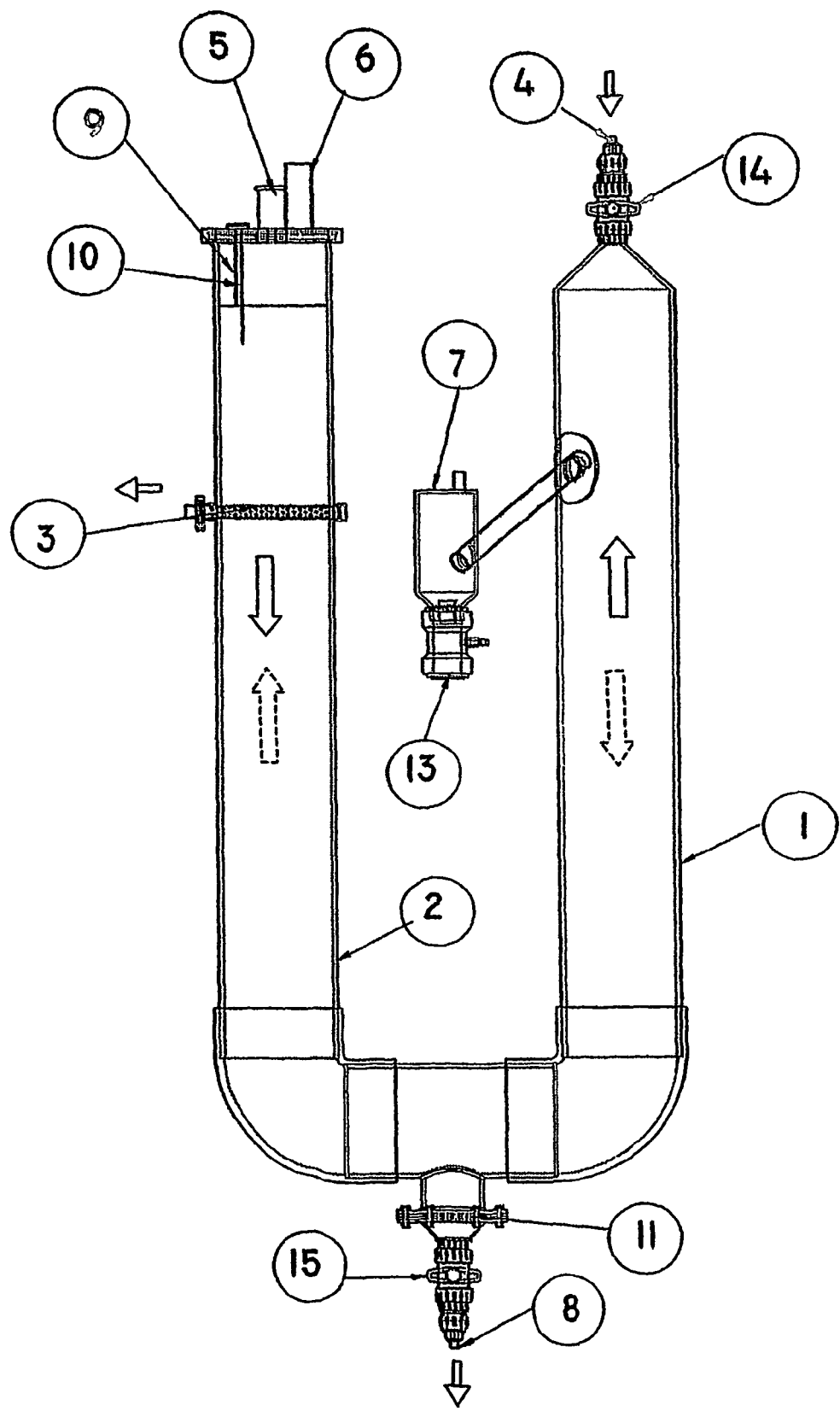
FIG. 4 illustrates an apparatus for desorbing material according to an alternative embodiment, wherein the apparatus includes two chambers interconnected in a U-shape.

FIG. 4 illustrates an alternative embodiment in which the chambers 1 and 2 are interconnected in a U-shape. Specifically, chambers extend upwardly from opposite ends of a horizontal passageway that interconnects the chambers. The diameter of the passageway is substantially the same as the diameter of the chambers 1 and 2 such that the resin can be conveyed from chamber 2 to chamber 1 using the pulsation techniques described above.

The passageway also provides fluid communication between the chambers 1 and 2 such that liquid head of desorption solution in chamber 1 causes desorption solution to flow upwardly in the outer chamber 2.

Figure 5:
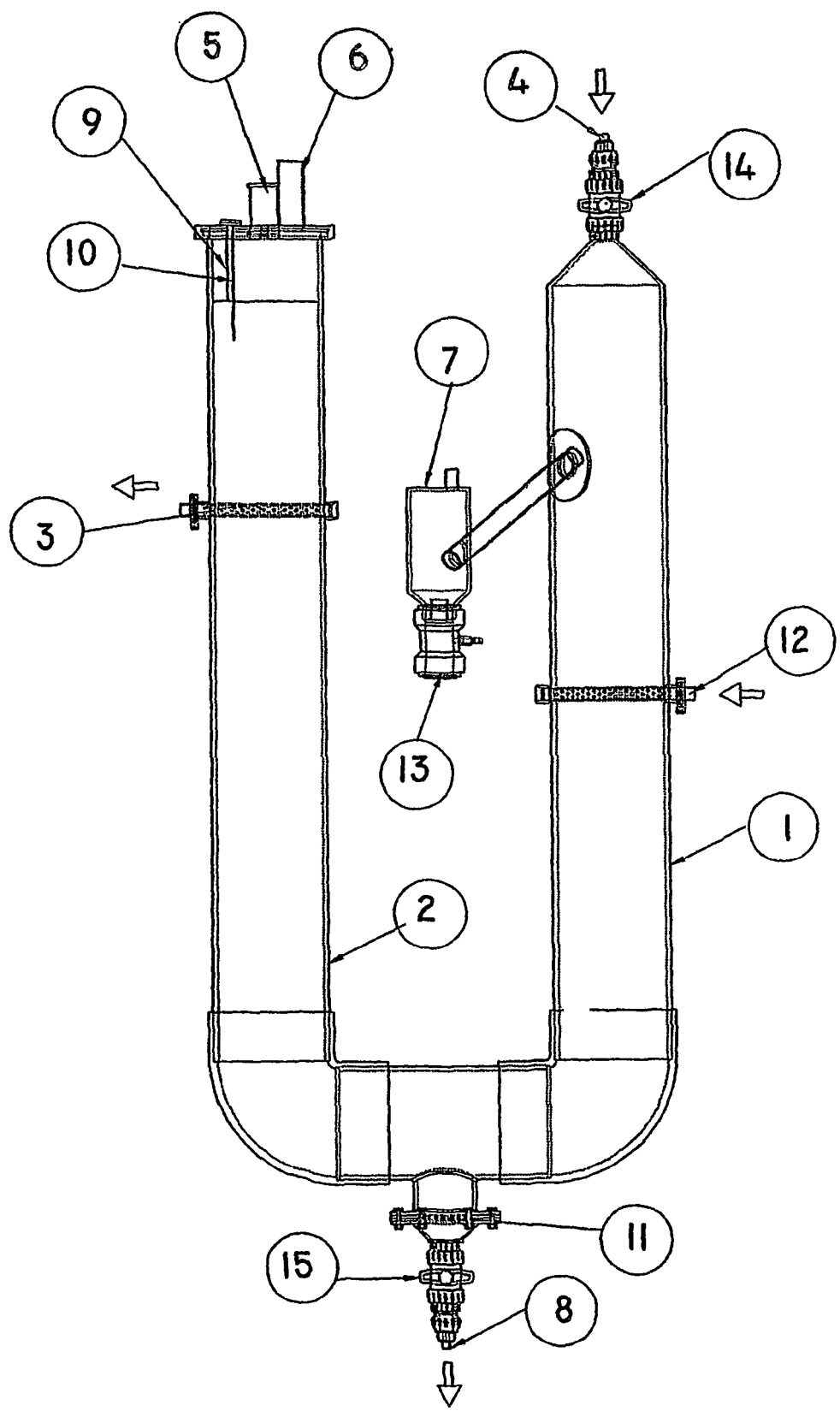
FIGS. 5 and 6 illustrate the embodiment shown in FIG. 4 with additional features.
Figure 6:
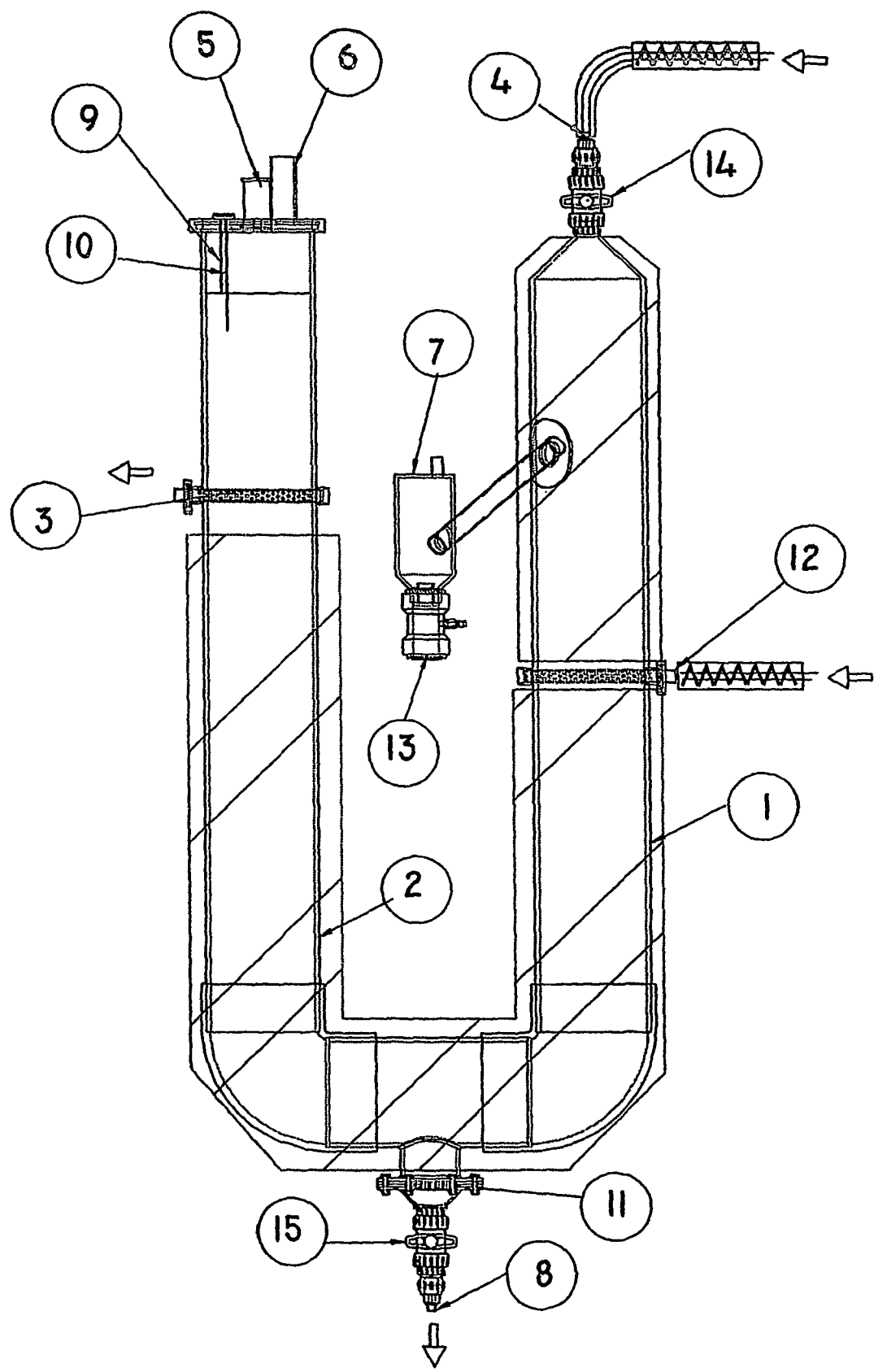

Moreover, the embodiment shown in FIGS. 4 to 6 includes the same features as the embodiment shown in FIGS. 1 to 3 and can be operated in the same manner. The same reference numerals have been used on both embodiments to show the same features.

It is envisaged that the embodiments of the present invention can be operated so that the resin and desorption solution flow continuously and in countercurrent. However, it will appreciated by those skilled in the art that the flow of desorption solution and the movement of resin may be intermittent and in general terms, a continuous desorption process is one in which resin moves intermittently through a desorption apparatus. In particular, the movement of resin in a desorption apparatus normally involves an the resin being moved along the bed in intermitted increments whereby a slug of resin is discharged from an end of the bed and the rest of the resin moves in a direction along the bed.

The present invention will now be described with reference to the following non-limiting examples.

EXAMPLE 1

This example illustrates the desorption of copper from the resin that was saturated during the treatment of a waste-water steam of a copper electroplating plant. The example was carried out using the apparatus design as shown on FIG. 4.

The copper concentration in the rinse water was about 50-80 ppm and the resin loading capacity reached 28-32 g/l.

The desorption trial was performed in a 150 L-plastic U-shape column in accordance with the embodiment shown in FIG. 4. The loaded resin entered the column via the spigot 5 located on the lid of the column. After desorption the fully stripped resin was removed on an hourly basis from the column through the transfer pipe and the intermediate tank 7. The resin passed through the column at a rate of 20 L/hr.

A 7% solution of sulphuric acid was used as the desorption solution. A desorption stream was pumped at a rate of about 22 L/hr into the top of the desorption zone of the column via the spigot 4 with valve 14 in the open position.

A waste stream was removed via the drainage 3 at the rate of 11.5 l/hr-12.5 l/hr. The copper concentration in the waste stream was less than 200 ppm and was returned together with the rinse water to the sorption stage.

An eluate stream was collected from the bottom of the column through screen 11 and pipe 8. The eluate solution was discharged at a rate of 9.5-10.5 l/hr using valve 15. The copper concentration reached 60 g/l in the eluate stream, very near to the maximum of the solubility of the copper sulphate ($CuSO_4 \cdot 5H_2O$) (bluestone). The eluate stream is analytically and economically suitable for the direct copper recovery using the well-known methods such as copper electrowinning or cupric sulphate precipitation.

It is envisaged that an eluate stream formed by the above example can be used directly in a copper-electroplating bath and the waste rinse water containing copper can be returned to the production circuit a copper electroplating plant. It is also envisaged that the treated water may be returned to a water system of the copper electroplating plant.

EXAMPLE 2

This example illustrates desorption of nickel from the resin, which was loaded during the sorption recovery of nickel from high-pressure laterite leach slurry. The example was carried out using the apparatus shown in FIG. 4.

Elemental analysis for the loaded resin is shown in Table 2.1.

The desorption equipment consisted of a U-shape plastic laboratory column with volume 750 ml. The resin flowed through the column at a rate of 100 ml/hr.

A 10% solution of hydrochloric acid was used as a desorption liquor. The solution was pumped into the column via the spigot 4 and the valve 14 and flowed through the desorption and re-absorption zones at rate about 160 ml/hr. The flow of the desorption solution was divided to two unequal parts:

i) The waste solution stream, which was collected after desorption from the drainage 3 at volume about 100 ml/hr and input to the sorption stage together with the pregnant leach slurry.

ii) The resulting eluate stream, which was collected from the bottom of the column via the pipe 15 and the opened partly valve 8 at volume 60 ml/hr. Elemental analysis for the eluate and waste streams are set out below in Table 2.1.

TABLE 2.1

Results of the elemental analysis of the starting and resulting products.

| Elements | Loaded resin, g/l | Eluate stream ppm | Waste stream, ppm |
|---|---|---|---|
| Ni | 36.81 | 59 510 | 382 |
| Co | 1.65 | 1 460 | 493 |
| Mn | 2.16 | 701 | 2 750 |
| Mg | 3.40 | 72 | 2 560 |
| Fe | 0.18 | 127 | <0.001 |
| Cu | 0.27 | 69 | 0.08 |
| Zn | 0.22 | 141 | 86 |
| Ca | 0.35 | 103 | 396 |
| Si | 0.02 | 30 | 0.24 |
| Cr | 0.01 | 1.34 | 0.65 |
| Al | 0.24 | 123 | 6.05 |

These results of the example show that the concentration of nickel in the eluate was about 60 g/l, which we estimate to be approximately 60% greater than the loading capacity of the pregnant resin. It is also noted that the majority of impurities, for example magnesium and manganese were discharged in the waste solution discharged via outlet 3 and as a result, the high concentrated eluate is suitable for nickel electrowinning recovery.

EXAMPLE 3

This example illustrates desorption of copper from a saturated resin, which was previously loaded during the sorption copper recovery from the heap leaching liquor. The copper concentration was between 2 g/l to 6 g/l.

The loading capacity of the resin, involved in this copper trial, was 55-64 g/l. During this test the resin flowed through the desorption column at a rate of approximately 100 ml/hr.

The desorption trial was performed in a 750 ml borosilicate glass column in accordance with the apparatus shown in FIG. 6. The U-shape column was fully insulated to keep the temperature within the column between 60-70° C.

A 10% solution of sulphuric acid was used as a desorbent, which was preheated up to 60-70° C. using an electric heater, on the inlet 4 of the desorption solution. The flow of the desorbent was maintained at rate of about 75 ml/hr In addition, a preheated mother liquor, after the precipitation of the copper sulphate, was pumped into the middle of chamber 1 through the inlet tube 12 with a throughput of about 85 ml/hr. In this mother liquor, the copper concentration was about 45 g/l.

A waste stream was removed from chamber 2 through the drainage 3 at rate of ~60 ml/hr and the copper concentration was less than 100 ppm. This waste solution may be reused in the copper heap leaching process.

A saturated eluate stream was collected from the bottom of the apparatus via the pipe 8 and the adjusting valve 15 at a rate of 100 ml/hr, with a copper concentration of about 100 g/l and temperature ~65° C.

The eluate stream was cooled to 20° C. with continuous mixing and approximately 234 g of the copper sulphate crystals were precipitated from every liter of the eluate stream. After filtration of the copper sulphate crystals, the mother liquor with the copper concentration about 45 g/l was heated to ~70° C. and reused to supply inlet tube 12.

EXAMPLE 4

This example illustrates the desorption of molybdenum from a loaded resin that was saturated during adsorption from molybdenum-containing solutions. The molybdenum concentration of these solutions was ~1 g/l, so the equilibrium loading capacity of the resin was about 100 g/l.

A desorption trail was performed in a 30 L column in accordance with the apparatus shown in FIG. 1. The loaded resin was placed into the outer chamber 2 of the column via the spigot 5. During this trail the resin flow was maintained at rate of ~3 l/hr.

A 10% ammoniac solution was used as a desorbent. This solution was pumped into the inner chamber 1 of the column via the spigot 4 with valve 14 in the open position. The throughout was kept 4 l/hr.

A waste solution stream with a molybdenum concentration of less than 200 ppm was collected from drainage 3 at rate of about 2 l/hr and returned with the pregnant solution on the sorption stage.

A saturated eluate stream was collected from the bottom of the column through the screen 11 and the pipe 8. The volume of the removed eluate was regulated using the valve 15. The molybdenum concentration of the eluate stream was ~150 g/l and the main impurities concentrations were negligible. The solution is suitable for the economical recovery of the chemical grade ammonium paramolibdate.

EXAMPLE 5

This example illustrates a method of nickel desorption from a saturated resin with the nickel loading capacity of about 42 g/l. The resin was loaded during the sorption nickel recovery from the atmospheric leach laterite slurry.

A desorption equipment consisted of a 750 ml column in accordance with the embodiment shown in FIG. 3. The loaded resin was placed into the column through the spigot 5. The resin flow during this test was kept at rate of ~100 ml/hr.

A 10% solution of sulphuric acid was used as the desorption solution. The throughout of the desorbent was regulated by the peristaltic pump and maintained at rate of ~75 ml/hr. The desorbent was pumped into the top of the desorption zone of the column via the spigot 4 and the valve 14.

The solution after the nickel electrowinning process contained 43 g/l and was pumped into the middle of the desorption zone of the column at rate of ~85 ml/hr through the drainage 12.

A waste solution stream (about 60 ml/hr) was removed from the column via the drainage 3. This solution contains about 200 ppm of nickel may be reused in the leaching process.

An eluate stream was collected from the bottom of the column through the valve 15 and the pipe 8 at rate of about 100 ml/hr and contained about 85 g/l of nickel. This solution may be used for the nickel electrowinning.

The claims defining the invention are as follows:

1. A method for desorbing substances from a resin in an apparatus having first and second chambers connected in fluid communication, the method including the steps of:
    a) supplying a loaded resin having targeted materials and impurities sorbed thereon to the first chamber and the resin moving in a downward direction within the first chamber, wherein impurities having less affinity for the resin than the targeted materials are desorbed from the resin and targeted material can be sorbed onto the resin in the first chamber;
    b) conveying the resin from the first chamber to the second chamber and moving the resin in an upward direction within the second chamber;
    c) supplying a desorption solution to the second chamber such that the solution flows downwardly in the second chamber and upwardly in the first chamber in countercurrent flow to the direction of movement of the resin within the first and second chambers;
    d) discharging stripped resin from the second chamber;
    e) discharging a first stream of desorption solution containing a high concentration of impurities and a low concentration of targeted substances from the first chamber; and
    f) discharging a second stream of desorption solution containing a relatively high concentration of targeted material and a relatively low concentration of impurities from a lower region of the first and/or second chambers and/or from the solution being conveyed between the chambers.

2. The method according to claim 1, wherein any two or more of steps a) to f) are carried out simultaneously.

3. The method according to claim 1, wherein the desorption of impurities from the resin substantially occurs in an upper zone of the first chamber and thereby allows further targeted material from the desorption solution to be sorbed onto the resin in the upper zone of the first chamber.

4. The method according to claim 3, wherein the first stream discharged in step e) is discharged from the upper zone of the first chamber.

5. The method according to claim 1, wherein the targeted materials desorbed from the resin increases the density of the desorption solution and thus causes higher concentrations of desorption solution to settle toward lower zones of the first and second chambers.

6. The method according to claim 1, wherein the rate at which resin is discharged in step d) is controlled by the liquid level in the first chamber.

7. The method according to claim 1, wherein the resin discharged in step d) is discharged from an upper zone of the second chamber.

8. The method according to claim 1 including a step of supplying a solution containing targeted substances to the second chamber and thereby reduce the concentration of impurities in the second chamber.

9. The method according to claim 8, wherein the temperature of the concentrated solution ranges from approximately 60 to 100° C.

10. The method according to claim 9, wherein the solution containing targeted materials is supplied to the second chamber at a location between upper and lower zones of the second chamber.

11. The method according to claim 1, wherein moving resin upwardly in the second chamber according to step b) involves using resin pulsation techniques.

12. The method according to claim 1, wherein the desorption solution flows upwardly in the first chamber in accordance with step c) as a result of liquid head in the second chamber.

13. The method according to claim 1, wherein the first and second chambers are interconnected in a U-shape configuration whereby the first and second chambers form arms of the U-shape and the base provides the passageway through which resin and desorption solution can be conveyed.

14. The method according to claim 13, wherein the second stream of desorption solution containing a high concentration of targeted material can be discharged from the passageway extending between the first and second chambers.

15. The method according to claim 1, wherein the first and second chambers are arranged such that one of the chambers is located inside the other chamber.

16. The method according to claim 15, wherein the second chamber is located concentrically within the first chamber such that the first chamber has an annular across section.

17. The method according to claim 16, wherein the second chamber has a opening facing downwardly whereby desorption solution in the second chamber can flow directly from the second chamber into the first chamber and resin from the first chamber can move through the opening upwardly in the second chamber.

18. The method according to claim 15, wherein the second stream is discharged from the first chamber from an outlet pipe that is located below the opening of the second chamber.

* * * * *